United States Patent
Kilday

(10) Patent No.: US 8,600,948 B2
(45) Date of Patent: Dec. 3, 2013

(54) AVOIDING DUPLICATIVE STORAGE OF MANAGED CONTENT

(75) Inventor: Roger W. Kilday, Livermore, CA (US)

(73) Assignee: EMC Corporation, Hopkinton, MA (US)

( * ) Notice: Subject to any disclaimer, the term of this patent is extended or adjusted under 35 U.S.C. 154(b) by 459 days.

(21) Appl. No.: 11/364,960

(22) Filed: Feb. 28, 2006

(65) Prior Publication Data

US 2007/0061373 A1    Mar. 15, 2007

Related U.S. Application Data

(60) Provisional application No. 60/718,159, filed on Sep. 15, 2005.

(51) Int. Cl.
*G06F 17/00* (2006.01)
*G06F 7/00* (2006.01)

(52) U.S. Cl.
USPC ............ 707/661; 707/664; 711/161; 711/162

(58) Field of Classification Search
USPC ....... 707/101, 103 R, 103 Y, 103 Z, 200, 203, 707/204, 600–899, 999.001–999.206
See application file for complete search history.

(56) References Cited

U.S. PATENT DOCUMENTS

| | | | |
|---|---|---|---|
| 5,682,325 A * | 10/1997 | Lightfoot et al. | 709/229 |
| 6,345,362 B1 * | 2/2002 | Bertin et al. | 713/300 |
| 6,725,228 B1 | 4/2004 | Clark et al. | |
| 6,772,158 B1 * | 8/2004 | Giammaria | 1/1 |
| 7,003,551 B2 * | 2/2006 | Malik | 709/206 |
| 7,117,246 B2 * | 10/2006 | Christenson et al. | 709/206 |
| 7,472,163 B1 * | 12/2008 | Ben-Yoseph et al. | 709/206 |
| 2002/0122543 A1 | 9/2002 | Rowen | |
| 2002/0184457 A1 * | 12/2002 | Yuasa et al. | 711/161 |
| 2004/0015740 A1 * | 1/2004 | Dautelle | 714/37 |
| 2004/0034688 A1 * | 2/2004 | Dunn | 709/206 |
| 2005/0044170 A1 * | 2/2005 | Cox et al. | 709/217 |
| 2005/0065961 A1 * | 3/2005 | Aguren | 707/102 |
| 2005/0096047 A1 | 5/2005 | Haberman et al. | |
| 2005/0108435 A1 * | 5/2005 | Nowacki et al. | 709/246 |
| 2005/0120025 A1 * | 6/2005 | Rodriguez et al. | 707/10 |
| 2005/0169055 A1 * | 8/2005 | Lung | 365/185.17 |
| 2005/0171979 A1 * | 8/2005 | Stager et al. | 707/200 |
| 2005/0182910 A1 * | 8/2005 | Stager et al. | 711/162 |
| 2005/0187902 A1 | 8/2005 | Carpentier et al. | |
| 2005/0193093 A1 * | 9/2005 | Mathew et al. | 709/219 |
| 2005/0246398 A1 * | 11/2005 | Barzilai et al. | 707/204 |

OTHER PUBLICATIONS

Cohasset Associates, Inc., Compliance Requirements Assessment, IBM DB2 Records Manager and Record-Enabled Solutions, Oct. 2004.

(Continued)

*Primary Examiner* — Angelica Ruiz
(74) *Attorney, Agent, or Firm* — Van Pelt, Yi & James LLP

(57) ABSTRACT

Avoiding duplicative storage of managed content is disclosed. It is determined whether content associated with an object has been stored previously in an associated one of a plurality of storage locations used to store managed content with which the object is associated. If it is determined that the content has been stored previously in the storage location, the previously-stored content is associated with the object and the object, but not a duplicate copy of the content, is stored in the storage location.

22 Claims, 13 Drawing Sheets

(56) References Cited

OTHER PUBLICATIONS

Zhu et al., E-Mail Archiving and Records Management Integration Solution Guide, Using DB2 CommonStore and DB2 Records Manager, Jan. 2006.

EMAILxtender (EMAILxtender, "EMAILxtender 4.3 Technical Product Overview," 2002, Legato Systems, Inc.

Surendran, Arun C. et al.; "Automatic Discovery of Personal Topics to Organize Email," Jul. 2005, Microsoft Research, pp. 1-6.

Manco, Guiseppe et al., "Towards an Adaptive Mail Classifer," 2002, Institute of Italian National Research Council, pp. 1-12.

Segal, Richard B. et al., "MailCat: An Itelligent Assistant for Organizing E-Mail," 1999, ACM, pp. 276-282.

\* cited by examiner

AVOIDING DUPLICATIVE STORAGE OF MANAGED CONTENT

CROSS REFERENCE TO OTHER APPLICATIONS

This application claims priority to U.S. Provisional Patent Application No. 60/718,159 entitled AVOIDING DUPLICATIVE STORAGE OF MANAGED CONTENT filed Sep. 15, 2005, which is incorporated herein by reference for all purposes.

BACKGROUND OF THE INVENTION

Various solutions have been provided to manage a body of stored content. In one approach, a database is used to store metadata associated with the stored objects comprising a body of stored content. The database is used to perform such tasks as identifying and retrieving specific stored objects of interest. Such content management solutions have been used, e.g., in connection with other applications, appliances, etc., to create and manage data archives for file system data, email messages, and other content.

One challenge faced when archiving a large body of stored content is the shear volume of data required to be stored. In some cases, and in particular for certain types of content, such as email, the same content or portion of content may appear many times in a body of content, and in a typical approach each instance is represented in the metadata database and/or archived separately. For example, a document may reside in a file system and then be sent as an email attachment to a first recipient, who may add other content and forward the attachment to a plurality of other recipients, etc. One or more recipients may save a copy of the attachment on their local system, rename it, and then forward the renamed copy on to yet other destinations. Still another email user might include the same content in the body of an email message or other object. For certain types of object that require a relatively large amount of storage space, such as images and other multimedia objects, storing numerous copies of the same content can be inefficient and costly.

Therefore, there is a need for a way to efficiently store a body of managed content in a way that avoids unnecessary duplication in the storage of at least certain content.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Avoiding duplicative storage of managed content is disclosed. In some embodiments, it is determined whether content associated with an object has been stored previously in a storage location associated with the object. In some embodiments, the storage location is one a plurality of storage locations used to store managed content with which the object is associated. If it is determined that the content has been stored previously in the storage location, the previously-stored content is associated with the object and the object, but not a duplicate copy of the content, is stored in the storage location. In various embodiments, the content as stored in the storage location is retained until the expiration of the retention period for the last associated object remaining stored in the storage location.

Figure 1:
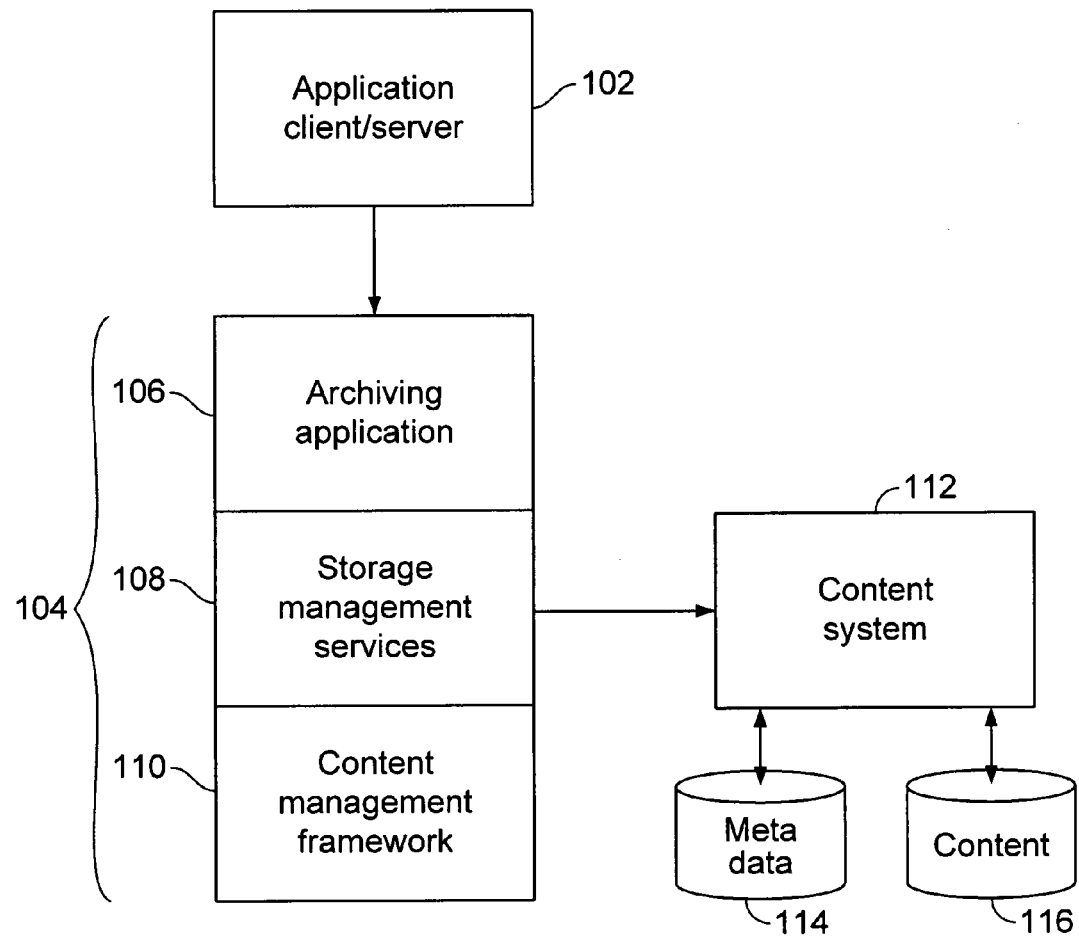
FIG. 1 is a block diagram illustrating an embodiment of a content storage management system.

FIG. 1 is a block diagram illustrating an embodiment of a content storage management system. In the example shown, an application client or server 102 provides content to a content management system 104. In various embodiments, application client or server 102 is one of a plurality of hosts configured to provide to content management system 104 content to be processed by content management system 104 for storage on and/or by content system 112. In some embodiments, application client or server 102 comprises a host on which application data, file system objects, mail messages, and/or other stored data objects are stored. In some embodiments, a host with which application client/server 102 is associated includes an agent, plug-in, or other application, applet, process, and/or device configured to forward to content management system 104 data to be processed by content management system 104 for storage on and/or by content system 112. In various embodiments, data is transferred between application client/server 102 and content management system 104 via one or more networks.

In the example shown, content management system 104 includes an archiving application 106, storage management services 108, and a content management framework 110. Archiving application 106 receives content from sources such as application client/server 102 and processes the content into a format required by the storage management services 108. In some embodiments, archiving application 106 comprises a web application developed using a set of web application development tools associated with storage management services 108, content management framework 110, and/or content system 112. Storage management services 108 uses content management framework 110 to process content for storage on content system 112. In some embodiments, content management framework 110 includes classes of objects used by content system 112 to process and store content, e.g., by extracting and/or associating with each object to be stored metadata associated with the object, storing metadata and corresponding content, finding and retrieving previously stored content, etc. As content is provided to it by archiving application 106, storage management services 108 parses the content, uses content management framework 110 to instantiate and populate the attributes of one or more objects to be used to represent and store the content in the body of managed content as stored on and/or by content system 112, and provides the object(s) to content system 112 for processing and storage. Content system 112 receives and processes the object(s) provided to it via the storage management services 108. Content system 112 extracts from the received object(s) metadata about the content to be managed and stored and stores the metadata in a metadata store 114. In some embodiments, the metadata store 114 comprises a relational database. In various embodiments, the metadata stored in metadata store 114 includes for each object such information as who created the object, what source system it came from, what application was used to create it, and object type specific data such as for an email message who sent the message, to whom, on/at what date/time, when it was received, what objects were included and/or attached to it, etc. The content system 112 stores the received object(s) representing and/or comprising the content in a content store 116.

In some embodiments, the content desired to be managed and stored comprises email messages and associated components, such as embedded and/or attached email messages, documents, images, and/or other objects and/or data. Archiving application 106 comprises an email archiving application or component that receives email messages and associated components from one or more email application clients/servers, e.g., by operation of an agent or plug-in, parses the messages into a format required by email storage management services 108, and provides the data to the email storage management services 108. The email storage management services instantiate and populate one or more objects associated with content management framework 110 and provide the object(s) to content system 112 for processing and storage. In some embodiments, at least one of the objects comprises an email message-specific object having one or more attributes typically associated with mail messages, such as "to", "from", "cc:", "bcc:", "subject", "sent date/time", and "received date/time".

in some embodiments, complex objects such as an email message may be represented and/or stored on and/or by content system 112 using two or more objects, the objects together comprising a "virtual document" or object that can be reassembled, e.g., upon receiving a request to retrieve a copy of the original email message, to recreate the original message. In some embodiments, large objects included in a message, embedded (e.g., forwarded or otherwise attached) email messages, and attachments are represented by and stored as separate objects from the primary email message, which primary message is represented by a primary or root object with which the other objects are associated, e.g., through data stored in metadata store 114. In various embodiments, smaller embedded and/or attached objects are included in the primary email message object and only larger attachments and/or embedded or attached email messages, for example, are represented by and stored as separate objects.

Figure 2:
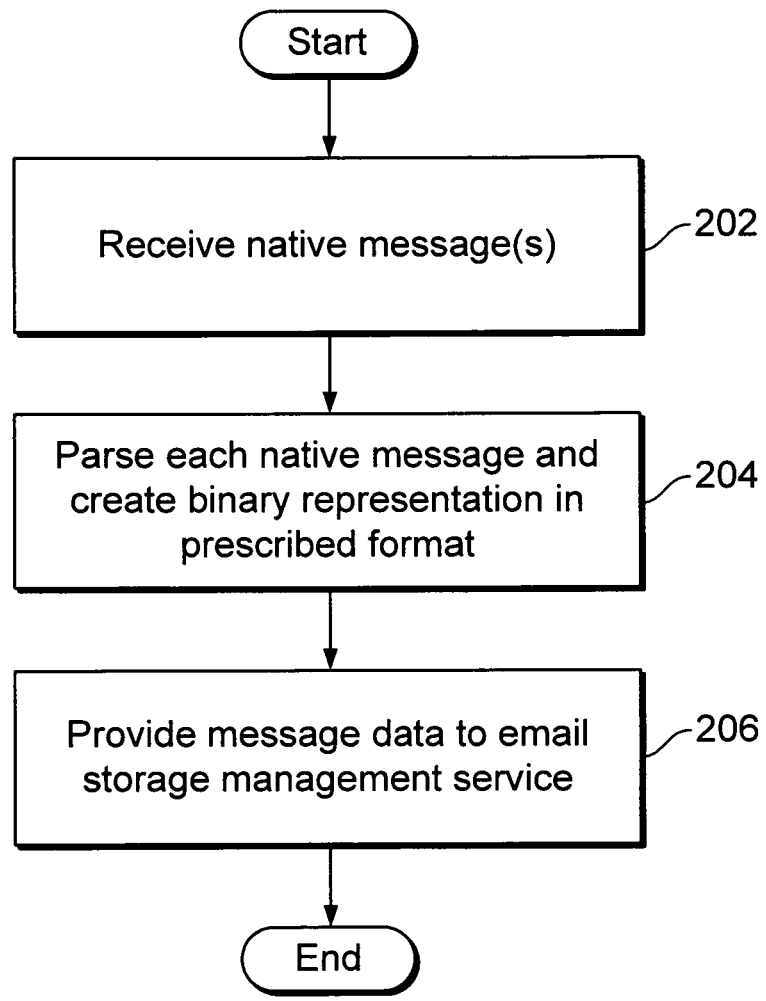
FIG. 2 is a flow chart illustrating an embodiment of a process for archiving mail messages.

FIG. 2 is a flow chart illustrating an embodiment of a process for archiving mail messages. In some embodiments, the process of FIG. 2 is implemented by an email archiving application such as archiving application 106 of FIG. 1. At 202, one or more mail messages, in their native format, are received. At 204, the native messages are parsed and a binary representation of the message data, using a prescribed format, is created. In some embodiments, the parsing includes extracting header and/or other data from the native mail message. In some embodiments, the binary representation is in a format required and/or understood by one or more email storage management services, such as storage management services 108 of FIG. 1, configured to receive the binary data and instantiate and populate objects to be provided for processing and storage by a content system such as content system 112 of FIG. 1. At 206, mail message data is provided to an email storage management service. In some embodiments, the data provided in 206 includes the native message and the binary representation. In some embodiments, the binary representation is used by an email storage management service and/or content system to determine metadata associated with the mail message and/or to generate one or more search index entries for the mail message.

Figure 3:
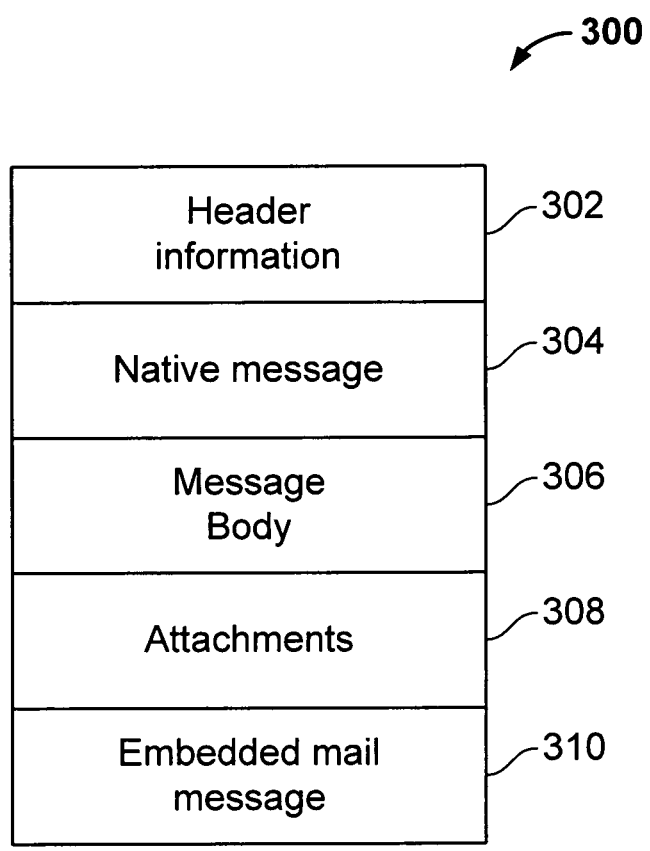
FIG. 3 illustrates an example of parsed and processed mail message data as provided in some embodiments by an email archiving application to an email storage management service in some embodiments.

FIG. 3 illustrates an example of parsed and processed mail message data as provided in some embodiments by an email archiving application to an email storage management service in some embodiments. The message data 300 includes header information 302—e.g., to, from, subject, sent date/time, received date/time, application, etc.—in a binary representation associated with an email storage management service to which the mail message data 300 is to be provided. The message data 300 also includes in this example the native mail message 304 as received by the email archiving application, e.g., from an application used to create, receive, or read the message and/or a plug-in, agent, or applet associated therewith. In some embodiments the native mail message is preserved to enable the original native message to be retrieved. The message data 300 includes a message body portion 306, which comprises a binary representation, in a prescribed format, of a main body portion of the mail message. The mail message data 300 also includes an attachments portion 308 which comprises attachments and associated data. Finally, in the example shown message data 300 includes an embedded mail message portion 310 in which data associated with messages attached to and/or included in the main mail message are stored.

Figure 4:
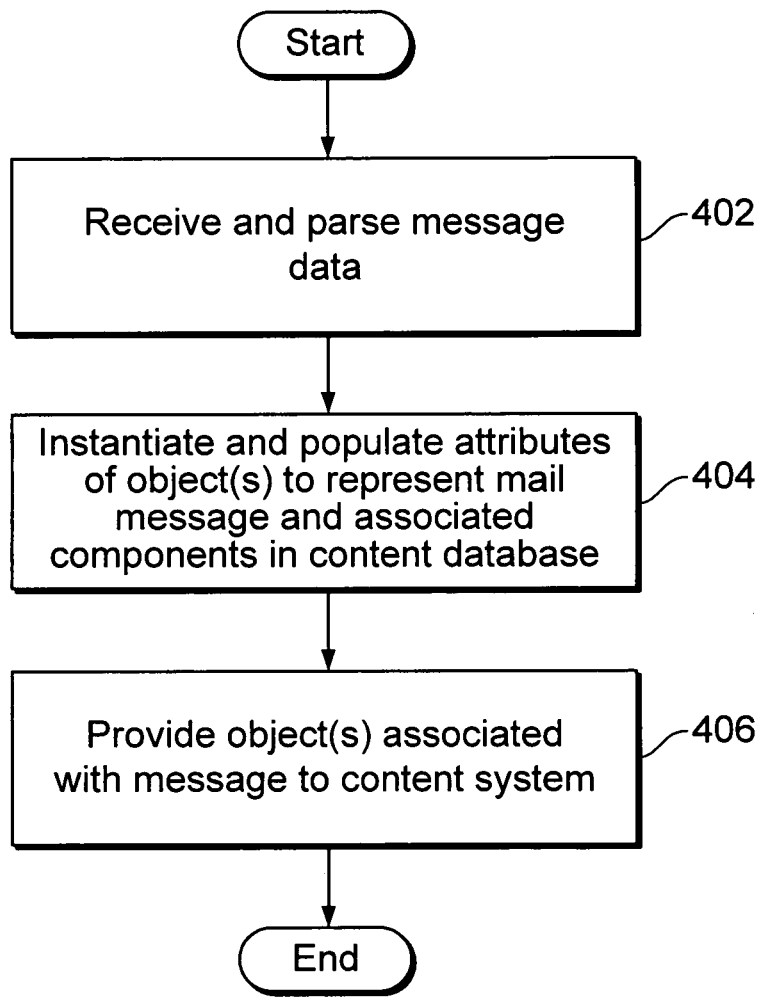
FIG. 4 is a flow chart illustrating an embodiment of a process for providing mail message data to a content system.

FIG. 4 is a flow chart illustrating an embodiment of a process for providing mail message data to a content system. In some embodiments, the process of FIG. 4 is implemented by one or more mail message storage management services, such as storage management services 108 of FIG. 1. At 402, message data such as message data 300 of FIG. 3 is received, e.g., from an email archive application, and parsed. At 404, one or more objects to be used to represent and store the mail message and associated data are instantiated and the attributes of each object are populated using the message data received at 402. At 406, the objects instantiated and populated in 404 are provided to a content system, such as content system 112 of FIG. 1.

Figure 5:
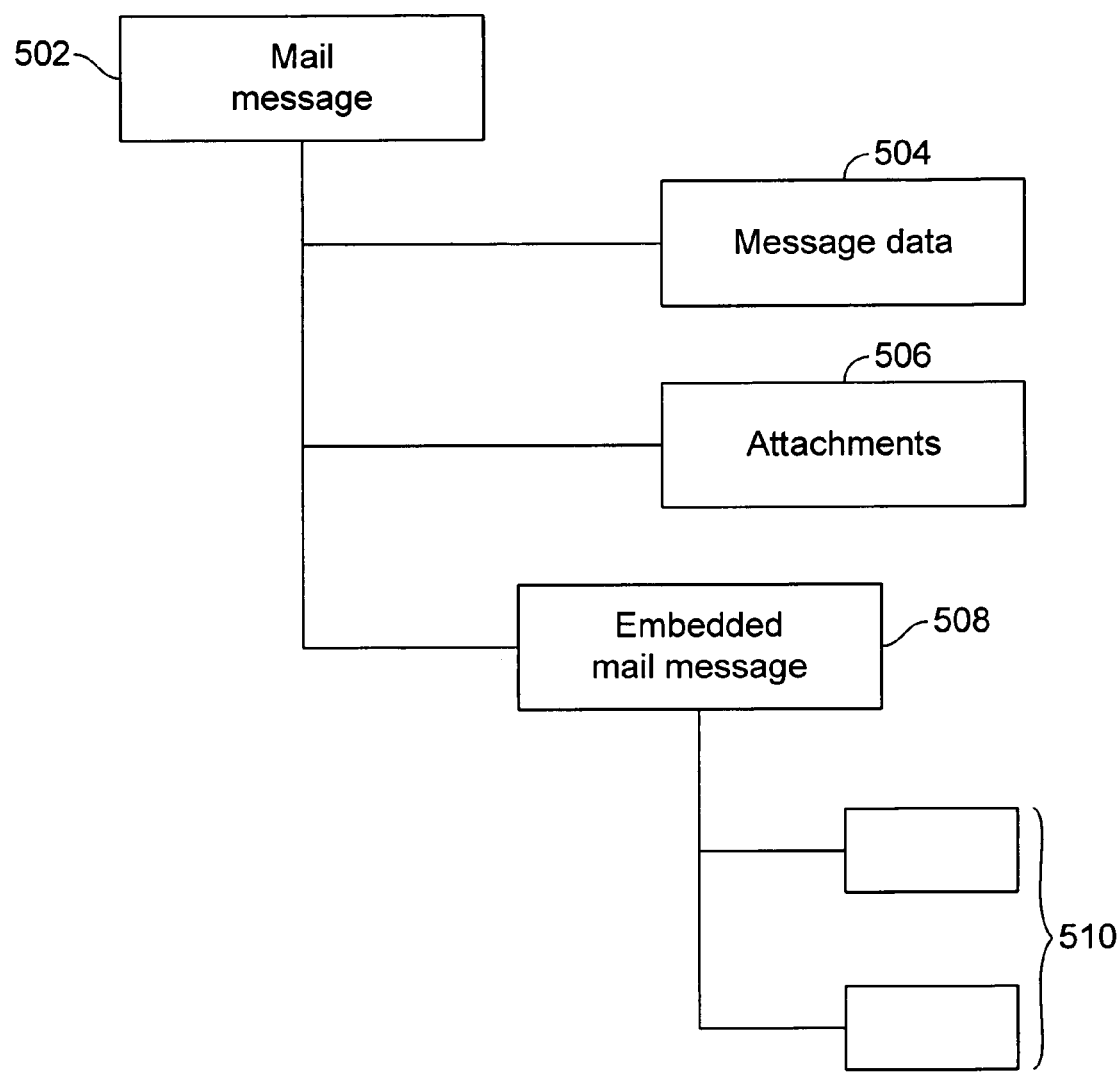
FIG. 5 is a diagram illustrating an example of objects as created in one embodiment to represent and store a mail message and its associated components.

FIG. 5 is a diagram illustrating an example of objects as created in one embodiment to represent and store a mail message and its associated components. A mail message and its associated components are represented by a primary (root) mail message object 502, an associated message data object 504 comprising a primary representation of the message data (e.g., native message, binary representation, etc.), zero or more attachment objects 506, as applicable, each attachment object representing an attachment and its associated content, and zero or more embedded mail message objects 508, each having its own associated objects 510, as applicable. In some embodiments, each embedded and/or attached mail message is represented by its own object, such as object 508, to facilitate efficient storage, backup, and retention policy enforcement with respect to each mail message and its associated components. Representing each embedded and/or attached mail message as a separate object facilitates efficient storage by allowing the contents of each mail message to be stored only once, or only once per physical and/or logical storage device or area. In some embodiments, if the contents of an embedded or other mail message have been stored previously, e.g., as determined by computing a hash value based on the message contents, for the subsequently encountered instance an object representing the instance is created and storage but the content is not; instead a routing table or other data structure associated with the message contents as stored previously is updated to reflect any new details associated with the message by virtue of the subsequently encountered instance, such as new recipients, send/receive times, etc. In some embodiments, the constellation of related objects shown in FIG. 5 comprises a virtual "document". Upon receiving a request to retrieve the associated mail message, the components of the message as shown in FIG. 5 are retrieved and assembled to recreate and provide the original message.

Figure 6:
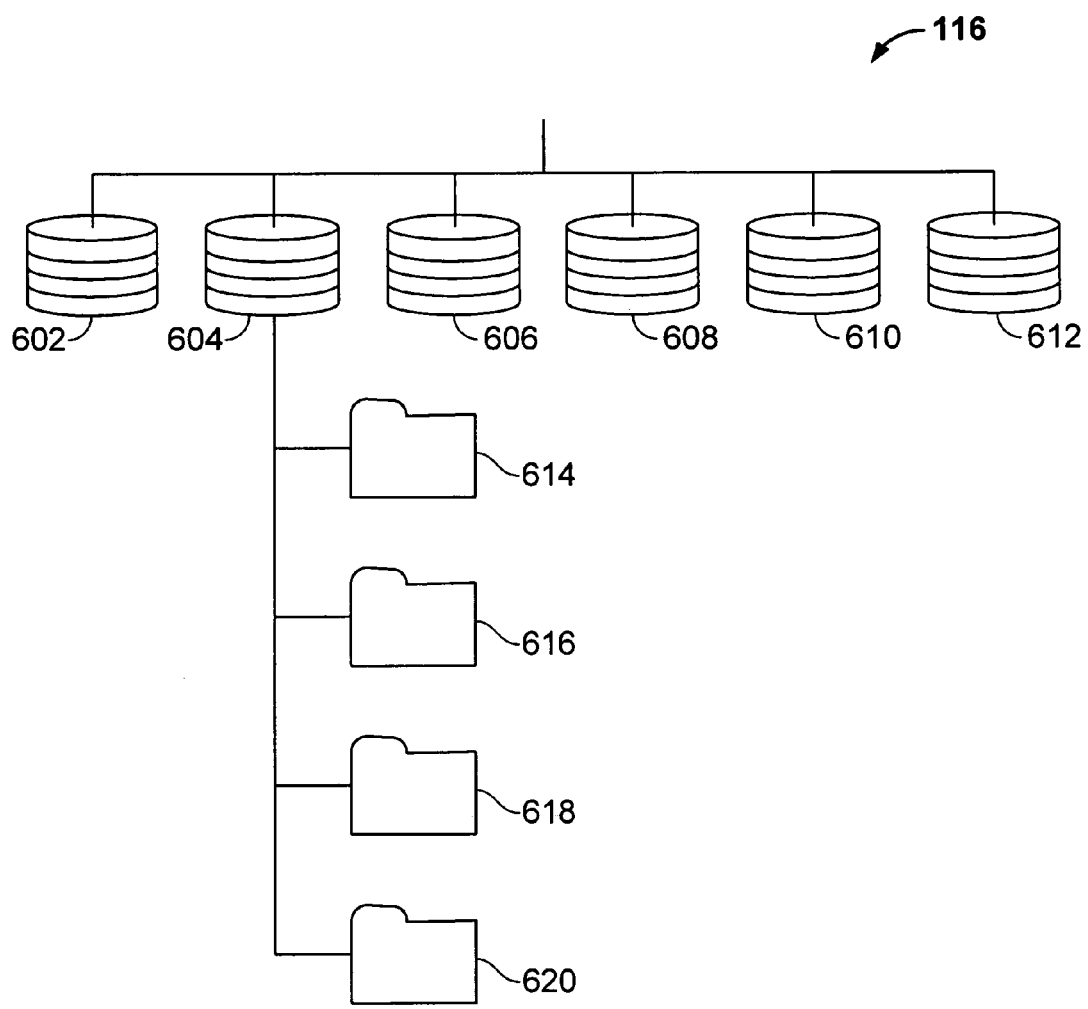
FIG. 6 illustrates an embodiment of a content store.

FIG. 6 illustrates an embodiment of a content store. In the example shown, the content store 116 includes six physical disk drives 602-612. In one embodiment, the drives 602-612 are configured to store managed content, such as mail messages, placed by a user, application, and/or other process in an archive or "vault" of mail messages required to be retained for six years after receipt. Storing mail message and/or other data in a manner that facilitates efficient storage, management, backup, retrieval, retention, and deletion of managed content is disclosed. In some embodiments, each of drives 602-612 contains data associated with mail messages received in a calendar year associated with the drive. Each drive in turn has associated with it one or more subfolders. In the example shown, drive 604 has associated with it four subfolders 614-620, e.g., one for each quarter of the calendar year. An object linked to a subfolder is stored in the drive associated with the subfolder and is automatically marked for retention for a period associated with the folder and/or automatically marked and/or schedule for deletion upon expiration of a retention period associated with the subfolder. In the example shown, deletion occurs for example on a quarterly basis. At the end of each quarter, the contents of the subfolder containing messages received in the corresponding quarter six years earlier are deleted in bulk by deleting all the messages linked to that subfolder and their associated components. In some embodiments, content and/or other objects pointed to by one or more other objects, e.g., later received mail messages, is not included in the bulk deletion, e.g., by writing a copy of the content to a secondary location. In some embodiments, when an object is linked to a subfolder, a process associated with the subfolder is invoked and causes a retention flag or other data value to be set and/or associated with the object, ensuring the retention policy associated with the subfolder will be applied to the object. In various embodiments, additional benefits to organizing managed content for storage, e.g., by storing mail messages received in the same period in the same physical and/or logical storage device and/or area, include efficient backup, since typically data in all but one of the drives will be static, and efficient retrieval, since more recently stored objects—which are those typically retrieved most often—are stored in the same storage location and a retrieving process will know where to go to find a particular object based on its received date. Mail messages and/or other stored content may be organized other than by data received, depending on the requirements of a particular implementation.

Figure 7:
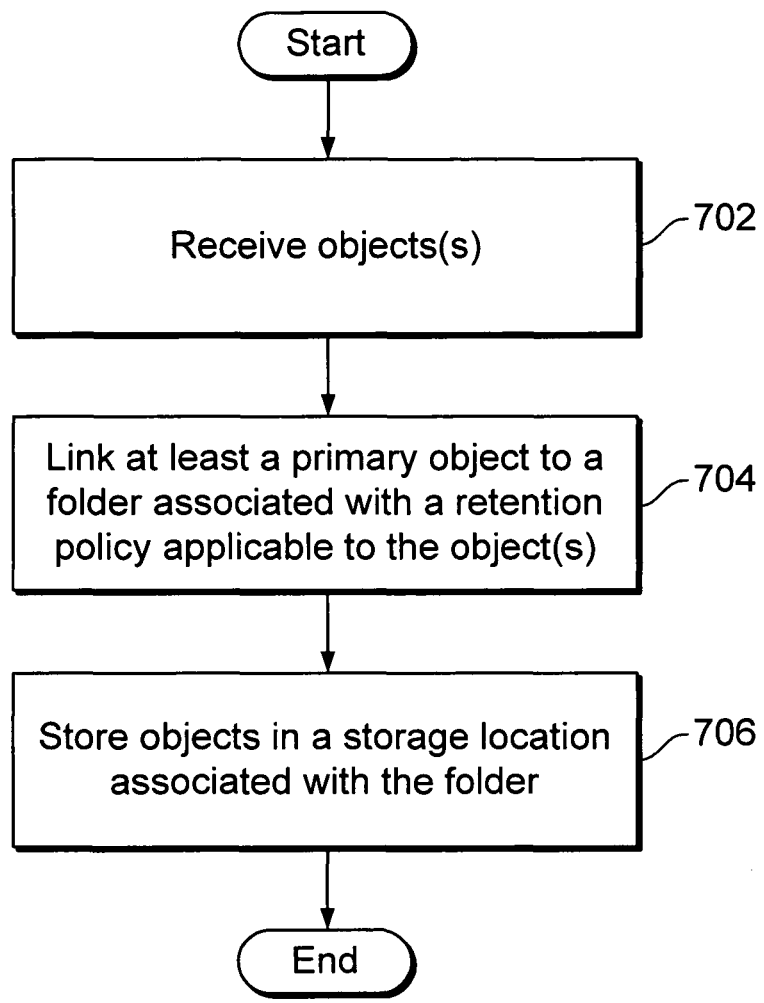
FIG. 7 illustrates an embodiment of process for receiving and storing objects.

FIG. 7 illustrates an embodiment of process for receiving and storing objects. In some embodiments, the process of FIG. 7 is implemented on a content system, such as content system 112 of FIG. 1. At 702, one or more objects are received. At 704, at least a primary (e.g., root) object is linked to a folder (e.g., a corresponding one of subfolders 614-620 of FIG. 6) associated with a retention policy applicable to the object(s). In some embodiments, the object(s) comprise an email message to be archived and at least a primary/root object is linked to a subfolder associated with a period (e.g., quarter, month, year, etc.) in which the email message was received. A process associated with the folder/subfolder is invoked and associates with the newly-linked object(s) a data value, entry, etc. that ensures that a retention policy associated with the folder/subfolder will be applied to the object(s). At 706, the object(s) received at 702 are stored in a storage location associated with the folder to which at least the primary object was linked in 704. In various embodiments, the storage area with which the folder/subfolder is associated is a physical storage device, e.g., a disk drive, and/or a logical storage location on a particular storage device, e.g., a partition or other subdivision of the device.

Figure 8:
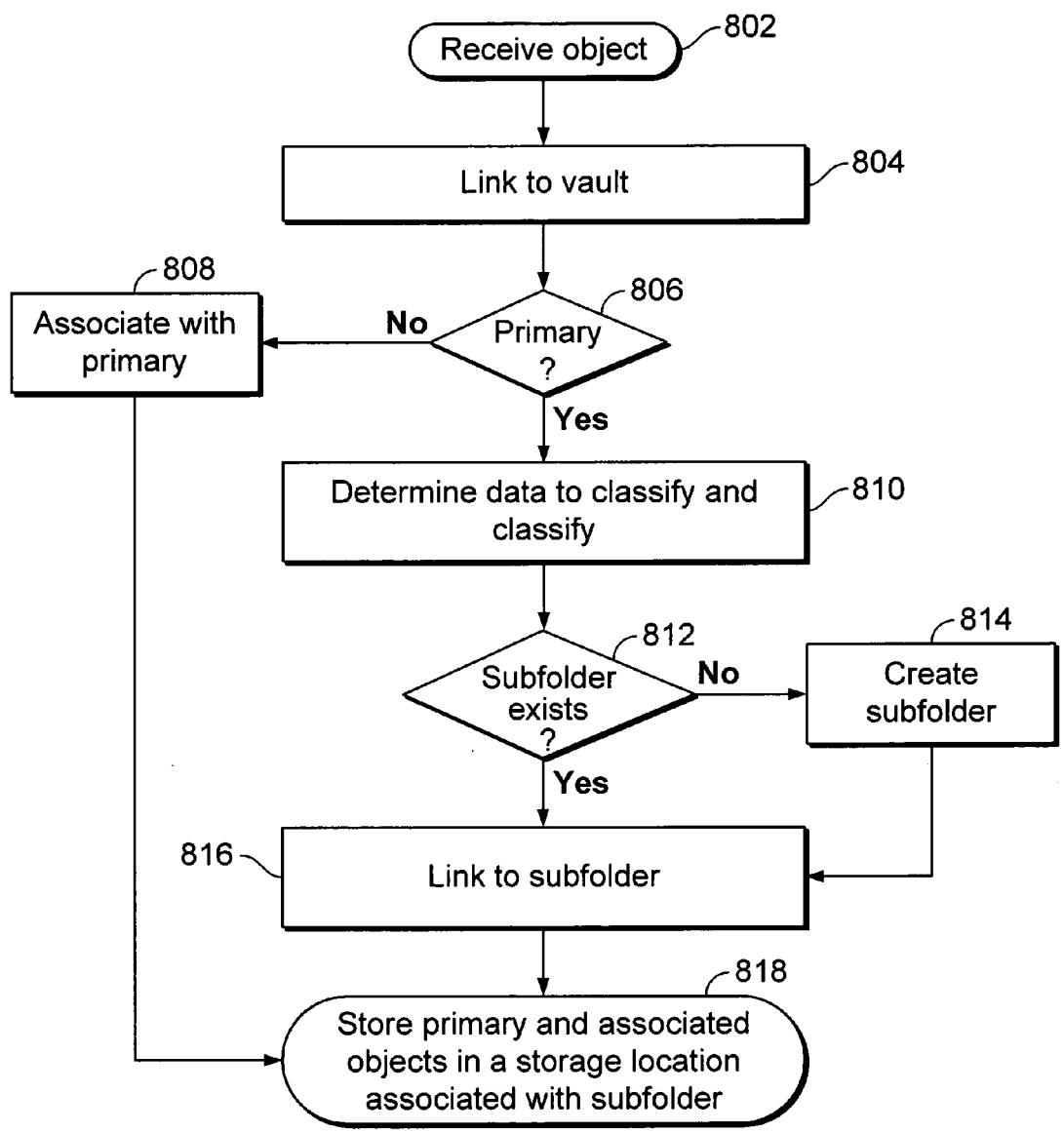
FIG. 8 illustrates an embodiment of a process for storing received objects.

FIG. 8 illustrates an embodiment of a process for storing received objects. In some embodiments, the process of FIG. 8 is implemented on a content system, such as content system 112 of FIG. 1. At 802 an object is received. At 804, the object is linked to a vault with which the object is associated. In some embodiments, a vault is created to store objects having a common attribute, such as a common retention period. A vault may be used to associate together objects having a common attribute that distinguish them from one or more other objects or sets of objects comprising a body of managed content. For example, in one embodiment a first vault is established to hold objects to which a two year retention requirement applies and a second vault is used to store objects to which a seven year retention requirement applies. In 806, it is determined whether the object is a primary (or root) object, e.g., a primary or root object for a mail message to be stored as a "virtual" document or object comprising two or more related objects, one or which is designated as the primary or root object. If an object is not a primary or root object, at 808 it is associated with the primary (or root) object to which it corresponds and it is subsequently stored with the primary object with which it is associated (see 818, described below). In some alternative embodiments, all objects (including those that are not primary) are linked to an associated subfolder and 806 and 808 are omitted. If the object is a primary or root object, at 810 data required to classify the object is determined. In some embodiments, one or more attributes of the object, as populated for example by a storage management service based at least in part on data received from an archiving application, are used in 810 to classify the object. For example, in the case of an email message, the date/time the message was received may be used to determine a relevant period (e.g., month, quarter, etc.) in which the message was received. At 812 it is determined whether a subfolder associated with the classification determined in 810 already exists. If the subfolder does not yet exist, it is created at 814. For example, if a received mail message object were the first object processed by a content system that had a receive date/time in the current (e.g., new) quarter, a subfolder for the current quarter would be created at 814. If the subfolder already exists (812) or once it has been created (814), at 816 the object received at 802 is linked to the subfolder associated with its classification, e.g., the subfolder associated with the period (month, quarter, etc.) during which a mail message with which the object is associated was received. In 818, the primary object, and any associated components (e.g., other objects associated with the primary object but not themselves linked directly to the subfolder) are stored in a storage location associated with the subfolder to which the primary object was linked at 816. For example, if the primary object was linked at 816 to subfolder 616 of FIG. 6, the primary object and associated components would be stored on disk drive 604 and, in some embodiments, within disk drive 604 in a partition associated with the subfolder.

Storing objects having a common attribute and/or to which a common policy applies, such as a common data retention period and/or policy, facilitates efficient storage, backup, maintenance, retrieval, retention, and/or deletion after retention of data objects comprising a body of managed content. In the case of mail messages, for example, except where an existing body of historical mail messages (e.g., messages saved over a period of time on local workstations) is being migrated en masse to an archive, most messages will have been sent recently. By organizing a "vault" in which mail messages are stored by the period in which they were received, once historical messages have been archived only (or primarily) data on the disk drive, partition, etc. associated with a current period will change, which allows backup of other disk drives to be performed less frequently or not at all if previously performed backups captured the current state of data on such drives. Likewise, once a retention period with which a subfolder or other organizational structure is associated has expired, the objects associated with the subfolder can be erased efficiently, e.g., by using lower level (e.g., bulk) commands to erase the entire contents of the subfolder and/or, as applicable in a given embodiment, the entire contents of a disk and/or applicable portion thereof (e.g., a partition, sector, or other subdivision).

Figure 9:
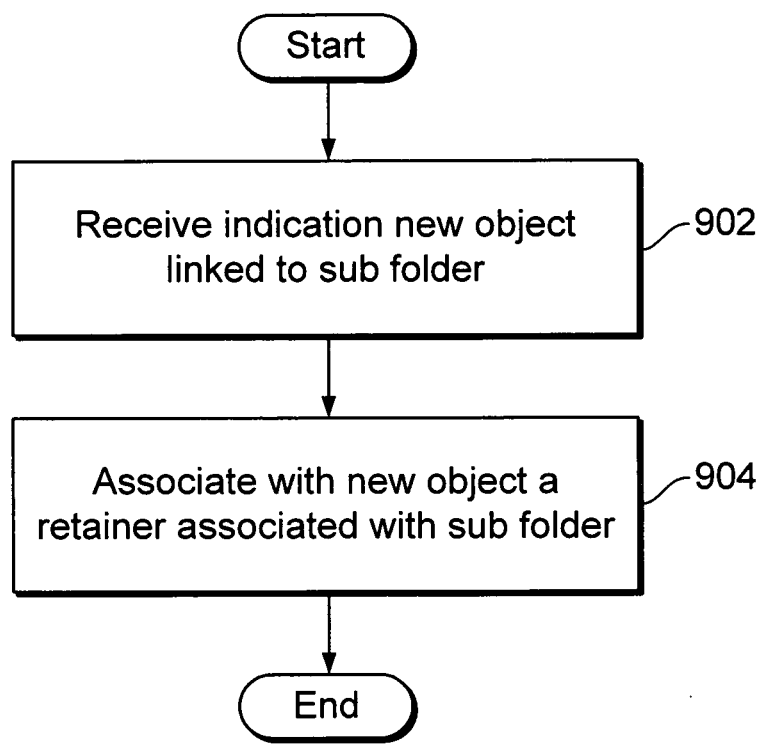
FIG. 9 illustrates a process for managing an object that has been linked to a subfolder.

FIG. 9 illustrates a process for managing an object that has been linked to a subfolder. In some embodiments, the process of FIG. 9 is invoked each time an object is linked to a subfolder, as in 704 of FIG. 7 and/or 816 of FIG. 8. At 902, an indication that a new object has been linked to a subfolder is received. At 904, data associating the object with a retention policy, period, schedule, and/or operation associated with the subfolder to which the object has been linked is associated with the object. In the example shown the data value is referred to as a "retainer". In some embodiments, associating with the object the retainer associated with the subfolder to which the object has been linked ensures the object will be retained for a period associated with the subfolder and then deleted at a prescribed time after the retention period has expired. In some embodiments, the retainer with which the stored object is associated comprises an object configured to store values associated with the retention policy to be applied and ensure that the requirements of that policy are enforced with respect to objects linked to the retainer object. Examples of retention policy data stored in the retainer object include the time for which the stored object is to be retained; whether required sign-offs (i.e., approvals) or other business process requirements or conditions have been obtained or satisfied (if required); and which policy the retention is derived from. In some embodiments, enforcing retention by linking a stored object to a retainer object configured to ensure the policy is enforced, as opposed to logic associated with a folder or other physical or logical container, simplifies implementation of folder navigation and enables retention to be assigned without linking the stored object to a folder. In some embodiments, stored objects in multiple folders are managed by a single retainer. In some embodiments, a stored object may be linked to multiple retainers, in which case multiple retention periods are enforced, e.g., by retaining the stored object until the last retention period to expire has ended.

Figure 10:
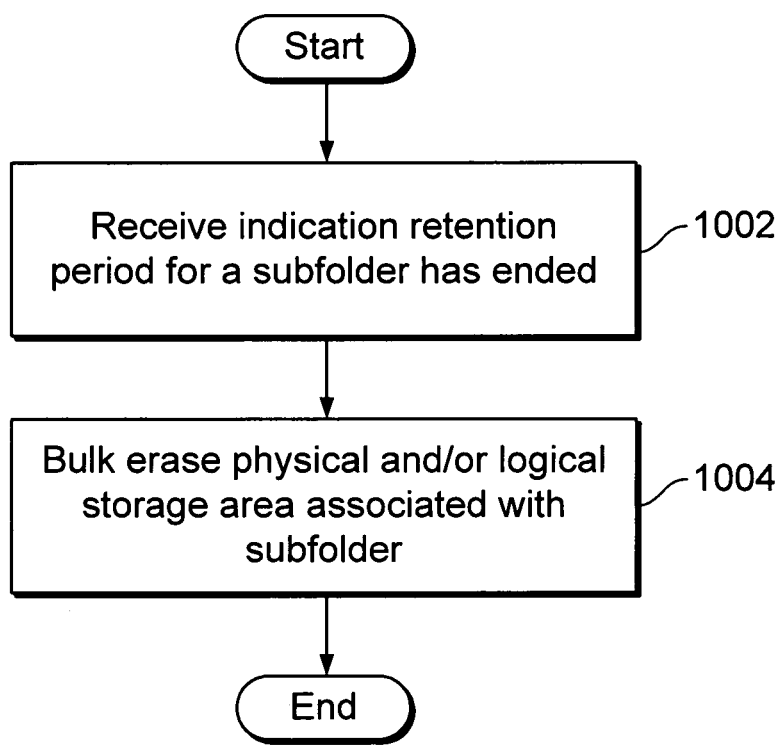
FIG. 10 illustrates an embodiment of a process for enforcing a retention policy with respect to contents of a subfolder.

FIG. 10 illustrates an embodiment of a process for enforcing a retention policy with respect to contents of a subfolder. At 1002, an indication is received that the retention period associated with a subfolder has ended. In some embodiments, an event to delete objects and/or content associated with a subfolder is scheduled when the subfolder is created. In some embodiments, upon being linked to the subfolder an object is scheduled for deletion at a time coinciding with the end of a retention period associated with the subfolder. At 1004, a physical (e.g., disk drive) and/or logical (e.g., partition, sector, folder, etc.) storage area associated with the subfolder is bulk erased.

In some embodiments, 1004 includes checking to determine whether any stored objects in the subfolder are required to be retained beyond the retention period for the subfolder, e.g., due to pending or anticipated litigation, regulatory requirements, etc., and any items required to be retained further are unlinked and/or moved from the subfolder prior to bulk erasure. In some embodiments, a retainer object linked to a stored object is used to indicate and/or determine that the stored object is required to be retained beyond a retention period applicable to the subfolder.

In some embodiments, the contents of a subfolder are not bulk erased and retention is instead implemented by deleting stored objects individually and/or in groups, e.g., by operation of a retainer object to which the item(s) has/have been linked. In some embodiments, providing separate physical and/or logical storage of stored objects having the same retention period facilitates retention, disposition, and management of backup media to which the stored objects in the subfolder have been copied, even in embodiments in which stored objects are deleted from the content server individually or in subgroups as opposed to in bulk.

Avoiding duplicating storage of content within a storage area in which two or more objects with which the same content is associated are stored is disclosed. In some embodiments, when it is determined that content associated with an object that has been or is to be stored in a physical storage device (e.g., a disk drive) and/or a logical storage area (e.g., a partition) has been stored previously in the same physical and/or logical storage device/area, the content is not stored in that device/area a second time and instead the previously stored content is associated with the subsequently stored object. For example, if the same content is determined to have been attached to and/or embedded in two or more mail messages having the same retention period, the content is stored only once in a physical/logical storage device/area associated with a subfolder with which the retention period is associated. Prior and/or subsequent instances of the same content from periods not associated with the same physical/logical storage device/area would in some embodiments result in a copy of the content being stored in a physical/logical storage device/area associated with such other instance(s), with the result that the same content is stored only once per physical/logical storage device/area, regardless of the number of objects stored in that physical/logical storage device/area point to the content. In some embodiments, storing such content only once per physical/logical storage device/area, but storing it at least once in each physical/logical storage device/area in which an object associated with the content is stored, facilitates efficient management of stored objects, for example by enabling objects/content to be deleted in bulk from one area—e.g., in connection with enforcement of a retention policy as described above—without affecting the integrity and/or completeness of objects/content stored in other locations, such as would occur, for example, if only one copy of content had been stored across storage locations and that copy were deleted before the retention period for other objects associated with the content expired.

Figure 11:
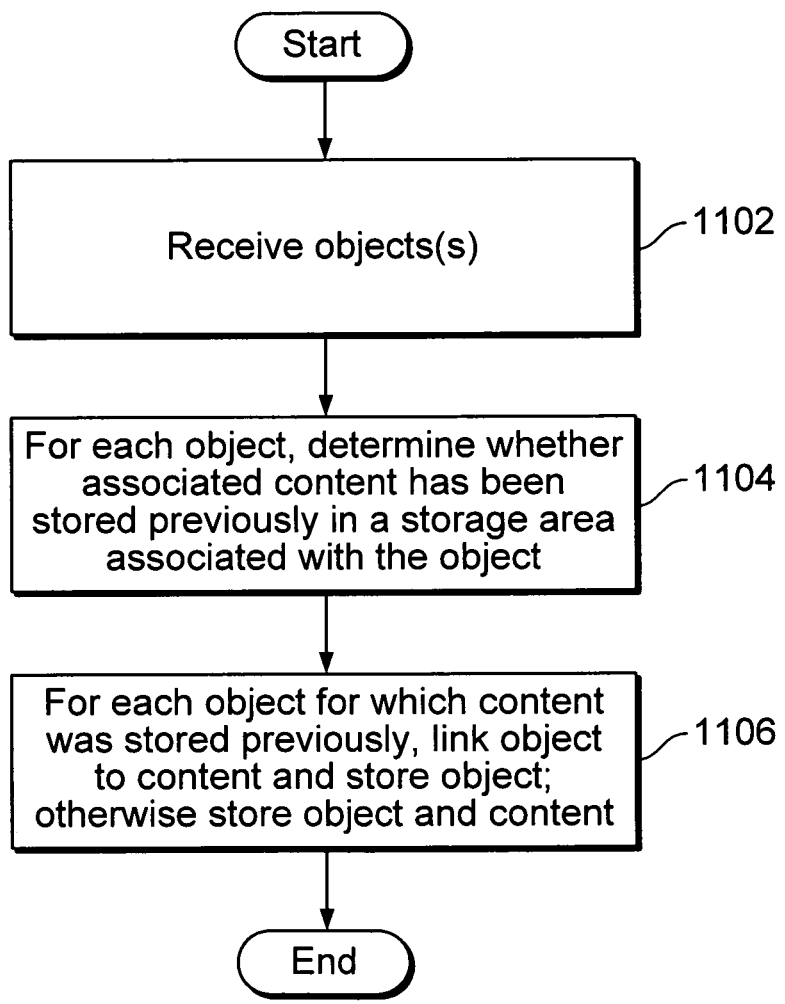
FIG. 11 illustrates an embodiment of a process for avoiding duplicate storage of content associated with two or more objects.

FIG. 11 illustrates an embodiment of a process for avoiding duplicate storage of content associated with two or more objects. In some embodiments, the process of FIG. 11 is implemented on a content system such as content system 112 of FIG. 1. At 1102, one or more objects are received. At 1104, it is determine for each object whether content associated with the object has been stored previously in a physical/logical storage device/area, e.g., in a physical disk drive and/or physical or logical subdivision thereof, associated with the object. In some embodiments, 1104 includes using an identifier and/or other data associated uniquely with the content to determine whether the content has been stored previously in the physical/logical storage device/area with which the object is associated. In some embodiments, 1104 includes computing a hash value based on at least a portion of the content and checking the hash value against a list or other data structure containing hash values of content stored previously in the physical/logical storage device/area with which the object is associated. At 1106, for each object for which associated content was stored previously in the physical/logical storage device/area with which the object is associated, the object is linked to the content as stored previously in that physical/logical storage device/area and the object (but not the associated content) is stored in the physical/logical storage device/area with which it is associated. Storing for each instance of the content an object associated with the instance, but not a duplicate copy of the content, conserves processing (e.g., overhead involved in storing and managing duplicate copies) and storage resources (e.g., disk space) while facilitating independent management (e.g., tracking, retrieval, retention, deletion upon expiration of associated retention period, etc.) of each instance. Storing the content at least once in each storage area in which an object associated with the content is stored in some embodiments enables efficiencies to be realized in enforcing backup and/or retention policies with respect to a body of managed content, including by facilitating less frequent backup of less dynamic portions of the managed content and bulk retention and/or deletion of objects and/or content for which the applicable retention period has expired, e.g., as described above.

Figure 12:
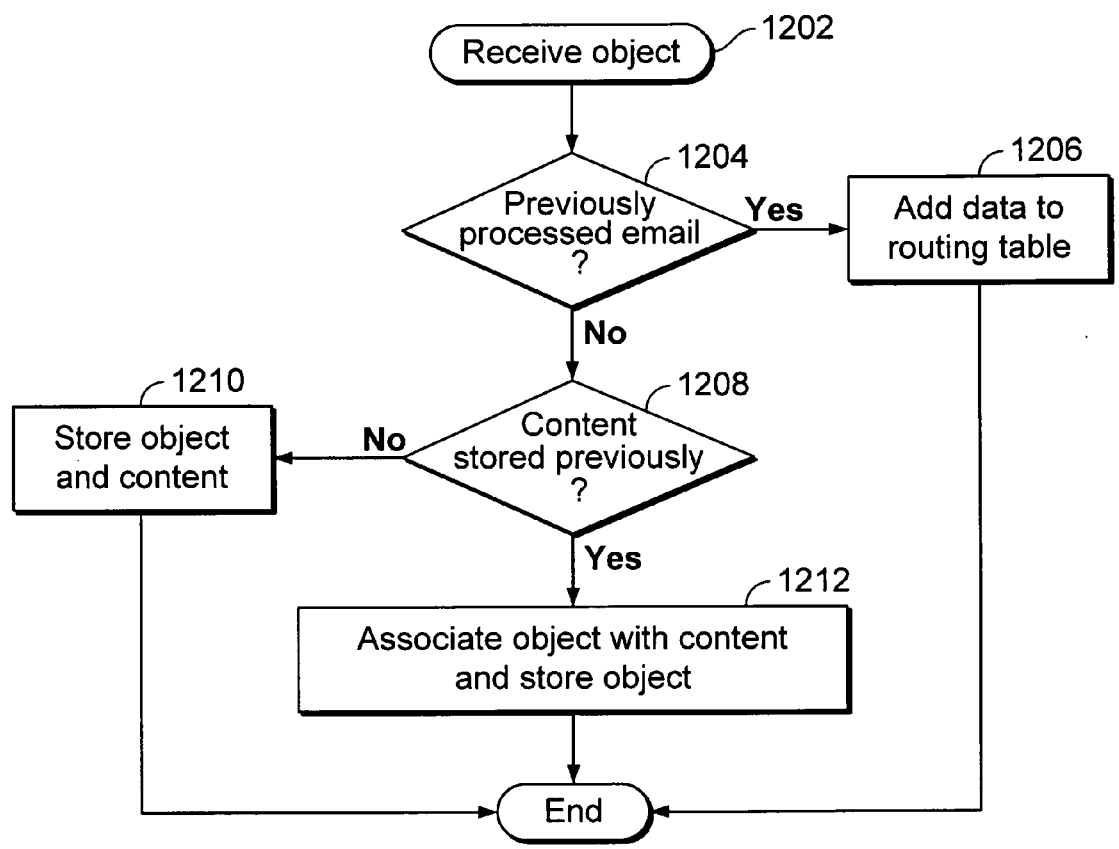
FIG. 12 illustrates an embodiment of a process for avoiding duplicate storage of content associated with two or more objects in the context of archiving mail messages.

FIG. 12 illustrates an embodiment of a process for avoiding duplicate storage of content associated with two or more objects in the context of archiving mail messages. In some embodiments, the process of FIG. 12 is implemented on a content system such as content system 112 of FIG. 1. At 1202, an object is received. At 1204, it is determined whether the object received at 1202 is the same (or, in some embodiments partly the same and/or otherwise related to) as a previously received email message. In some embodiments, 1204 includes computing a hash result based on at least part of the data comprising the object and checking the result against a list or other repository of hash results for email messages processed previously. If it is determined the same message was processed previously, at 1206 data associated with the instance of the message associated with the object received at 1202 is added to a routing table or other data structure associated with the mail message and the process of FIG. 12 ends. No further copy of the mail message is stored. In some embodiments, an object or entry pointing to the routing table is stored at 1206, to represent the instance of the mail message as received at 1202. If the object received at 1202 is determined not to be a previously processed mail message (1204), at 1208 it is determined whether content associated with the object received at 1202 was stored previously in a storage device/area associated with the object received at 1202, such as a disk drive, subfolder, and/or other physical and/or logical storage area in which objects having a common attribute as the object received at 1202, such as the same retention period, are stored. An example of a situation in which the same content may have been stored previously is content that was attached to and/or embedded in two or more different mail messages having the same retention period. If the content was not stored previously (1208), at 1210 the object received at 1202 and the associated content are stored, after which the process of FIG. 12 ends. If the content was stored previously in a storage area with which the object received at 1202 is associated, at 1212 the object is associated with the content as stored previously and the object (but not the content) is stored, after which the process of FIG. 12 ends.

Figure 13:
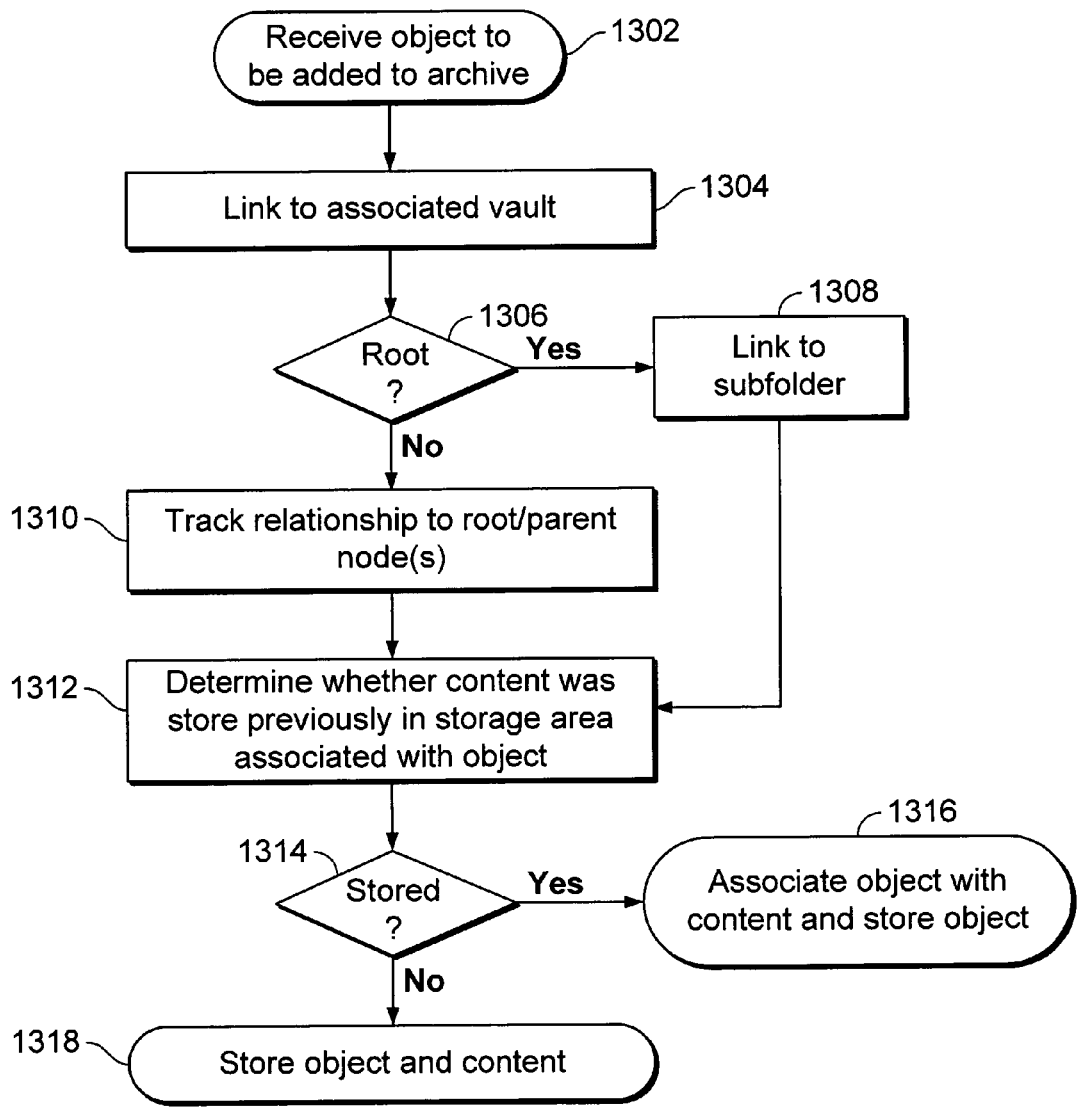
FIG. 13 illustrates an embodiment of a process for avoiding duplicate storage of mail message attachments in an embodiment in which mail message attachments are stored as separate objects linked to a primary or root object associated with the message.

FIG. 13 illustrates an embodiment of a process for avoiding duplicate storage of mail message attachments in an embodiment in which mail message attachments are stored as separate objects linked to a primary or root object associated with the message. At 1302, a object to be added to a mail message archive is received. At 1304, the object is linked to a "vault", i.e., a related body of content, with which it is associated. In some embodiments, mail messages are sorted, e.g., based on one or more attributes, such as who sent the message, who received it, the subject matter, where it was stored, etc., and assigned to a "vault" or other subset of the managed content. For example, mail messages in some embodiments are sorted based on the retention period that applies to each respective message (e.g., two years, seven years, etc.) and each is assigned and linked in 1304 to a vault associated with the retention period that applies to it. In some embodiments, the managed content is not segregated into separate bodies of content and 1304 is omitted. At 1306, it is determined whether the object received at 1302 is the primary or "root" object of the mail message with which the object is associated. If the object is the primary or root object, at 1308 it is linked to a corresponding subfolder based at least in part on one or more attributes of the object and a policy at least one consequence of which is common to at least a subset of the objects in the subfolder. For example, if the primary (root) object associated with a mail message to which a two year retention period applies were received in 1302 and the message was received in the first quarter of the year 2005, in some embodiments in 1308 the object would be linked to a subfolder associated with messages received in the first quarter of 2005. If the object is not the root object for the mail message with which it is associated (1306), e.g., because it is an object embedded in and/or attached to the primary message, in 1310 the relationship of the received object to its parent/root object is tracked. In some embodiments, 1310 includes linking the object to a subfolder to which the primary or root object is or will be linked. At 1312, it is determined whether content associated with the object was stored previously in a storage area associated with the object, e.g., a storage area in which objects linked to the subfolder to which the object and/or a primary or root object with which it is associated are stored. In some embodiments, 1312 includes computing a hash value based at least in part on the content and comparing the hash value to one or more hash values computed on corresponding data associated with previously-stored content. If the content was stored previously (1314), at 1316 the object received at 1302 is associated with the content (and vice versa) and the object (but not the content) is stored in a storage location associated with the subfolder to which the object and/or the primary/root object with which it is associated is linked. If the content was not stored previously (1314), the object and associated content are stored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for avoiding duplicative storage of content, comprising:
   determining whether content associated with an object has been stored previously in a physical storage location with which the object is associated, the physical storage location being one of a plurality of physical storage locations each with a retention period;
   in the event it is determined that the content has been stored previously in the physical storage location:
      associating the previously-stored content with the object; and
      storing the object, but not a duplicate copy of the content, in the physical storage location;
   in the event it is determined that the content has not been stored previously in the physical storage location, storing the object and the content in the physical storage location, even if a copy of the content is stored already in another of the plurality of physical storage locations; and
   upon receiving a retention notification that the retention period for the physical storage location has expired, using a low level command to bulk erase the entire contents including all objects and all content from the physical storage location without regard to its logical contents.

2. A method as recited in claim 1, wherein the object is linked to one or more other objects that together comprise a virtual document.

3. A method as recited in claim 1, wherein the object comprises data associated with a mail message.

4. A method as recited in claim 1, wherein the object comprises data attached to a mail message.

5. A method as recited in claim 1, wherein the physical storage location comprises a specified physical storage location with which the object is associated.

6. A method as recited in claim 1, wherein the physical storage location comprises a specified physical storage location associated with a set of objects with which the object is associated.

7. A method as recited in claim 1, wherein the physical storage location comprises one of a specified plurality of physical storage locations configured to store the managed content.

8. A method as recited in claim 1, further comprising deleting the content from the physical storage location upon expiration of a retention period associated with a last object associated with the content.

9. A method as recited in claim 1, further comprising first determining the object is to be stored in the physical storage location based on a date of receipt of the object.

10. A method as recited in claim 9, wherein the object comprises data attached to a mail message.

11. A method as recited in claim 10, wherein the physical storage location is a vault in which mail messages are stored based on having a common period in which they were received.

12. A method as recited in claim 1, further comprising retaining the content as stored in the physical storage location until the last retention period associated with a last object associated with the content expires.

13. A system for avoiding duplicative storage of content, comprising:
   a processor configured to:
      determine whether content associated with an object has been stored previously in a physical storage location with which the object is associated, the physical storage location being one of a plurality of physical storage locations each with a retention period;
      in the event it is determined that the content has been stored previously in the physical storage location:
         associate the previously-stored content with the object; and
         store the object, but not a duplicate copy of the content, in the physical storage location;
      in the event it is determined that the content has not been stored previously in the physical storage location, store the object and the content in the physical storage location, even if a copy of the content is stored already in another of the plurality of physical storage locations; and
      upon receiving a retention notification that the retention period for the physical storage location has expired, use a low level command to bulk erase the entire contents including all objects and all content from the physical storage location without regard to its logical contents; and
   a memory configured to provide instructions to the processor.

14. A system as recited in claim 13, wherein the physical storage location comprises a specified physical storage location with which the object is associated.

15. A system as recited in claim 13, wherein the physical storage location is one of a specified plurality of physical storage locations configured to store the managed content.

16. A system as recited in claim 13, wherein the processor is further configured to retain the content as stored in the physical storage location until a retention period associated with a last object associated with the content ends.

17. A system as recited in claim 13, wherein the processor is further configured to first determine the object is to be stored in the physical storage location based on a date of receipt of the object.

18. A computer program product for avoiding duplicative storage of content, the computer program product being embodied in a computer readable medium and comprising computer instructions for:
   determining whether content associated with an object has been stored previously in a physical storage location with which the object is associated, the physical storage location being one of a plurality of physical storage locations each with a retention period;
   in the event it is determined that the content has been stored previously in the physical storage location:
      associating the previously-stored content with the object; and
      storing the object, but not a duplicate copy of the content, in the physical storage location;
   in the event it is determined that the content has not been stored previously in the physical storage location, storing the object and the content in the physical storage location, even if a copy of the content is stored already in another of the plurality of physical storage locations; and
   upon receiving a retention notification that the retention period for the physical storage location has expired, using a low level command to bulk erase the entire contents including all objects and all content from the physical storage location without regard to its logical contents.

19. A computer program product as recited in claim 18, wherein the physical storage location comprises a specified physical storage location with which the object is associated.

20. A computer program product as recited in claim 18, wherein the physical storage location comprises one of a specified plurality of physical storage locations configured to store the managed content.

21. A computer program product as recited in claim 18, further comprising computer instructions for first determining the object is to be stored in the physical storage location based on a date of receipt of the object.

22. A computer program product as recited in claim 18, further comprising computer instructions for retaining the content as stored in the physical storage location until the last retention period associated with a last object associated with the content expires.

* * * * *